United States Patent [19]

Petralia

[11] Patent Number: 5,345,260
[45] Date of Patent: Sep. 6, 1994

[54] VIDEO TRANSFER DEVICE

[75] Inventor: Salvatore C. Petralia, Sayreville, N.J.

[73] Assignee: Recoton Corporation, Long Island City, N.Y.

[21] Appl. No.: 166,262

[22] Filed: Dec. 10, 1993

Related U.S. Application Data

[63] Continuation of Ser. No. 809,690, Dec. 16, 1991, abandoned.

[51] Int. Cl.5 .............................................. H04N 5/253
[52] U.S. Cl. ........................................ 348/98; 348/373
[58] Field of Search ....................... 358/96, 97, 98, 99, 358/100, 335, 343, 373; 355/45, 72, 75, 77; H04N 5/225

[56] References Cited

U.S. PATENT DOCUMENTS

| | | | |
|---|---|---|---|
| 2,976,357 | 3/1961 | Hammett | 178/7.2 |
| 3,104,283 | 9/1963 | Moller | 358/226 |
| 3,510,657 | 5/1970 | Margiaracina | 250/201 |
| 3,814,853 | 6/1974 | Landreau | 178/7.85 |
| 4,237,492 | 12/1980 | Roth et al. | 358/225 |
| 4,260,246 | 4/1981 | Rolleitz | 355/45 |
| 4,698,683 | 10/1987 | Schwartz et al. | 358/214 |
| 4,807,041 | 2/1989 | Kishi et al. | 358/256 |
| 4,868,661 | 9/1989 | Takahashi | 358/185 |
| 4,974,068 | 11/1990 | Hiramatsu et al. | 358/75 |
| 5,057,933 | 10/1991 | Takahashi | 358/335 |
| 5,132,804 | 7/1992 | Takahashi | 358/226 |
| 5,160,948 | 11/1992 | Bae | 352/1 |

OTHER PUBLICATIONS

Ambico Product Catalogue (pp. 29–30).
Ambico product sheets—models V–0651, V–0652 V–0612.
Product literature of Telemation, Inc., "Film and Optical Systems' series TMM–203 Multiplexors Series TMU–100 Uniplexers" (8 pages–1971).
A. Lind et al. *J. Smpte*, vol. 65, p. 140 (Mar. 1956).

*Primary Examiner*—Michael T. Razavi
*Assistant Examiner*—Tuan V. Ho
*Attorney, Agent, or Firm*—Levisohn, Lerner & Berger

[57] ABSTRACT

Apparatus which transfers photos, motion picture films and slides to videotape (or other video recording media) by means of a video camera and recorder, such as a camcorder, is operable in three modes: first for film or slide to video transfer using a movie or slide projector to present images from motion picture film or slides to the camcorder; second to illuminate a photo or other print and present the image therefrom to the camcorder; and third to illuminate with concentrated light a slide or transparency to present an image projected by the illumination to the camcorder thereby enabling direct transfer of images from slides or transparencies. The apparatus includes a box with openings on opposite ends and on a side thereof. A dual internal mirror is movable across the box to positions where light projected from the movie or slide projector is deflected by the mirror to the camcorder through openings at one end and the side of the box in the first mode of operation of the device and light from the illuminating source is concentrated on the slide or transparency for obtaining the third, direct transfer mode of operation. In the second mode of operation, the dual mirror is movable to a position where it does not block light from a photo to the camcorder so that the camcorder can receive the image on the photo when the camcorder and photo are located adjacent to the openings at the opposite ends of the box.

15 Claims, 6 Drawing Sheets

VIDEO TRANSFER DEVICE

This is a continuation of copending application Ser. No. 07/809,690, filed on Dec. 16, 1991, now abandoned.

DESCRIPTION

The present invention relates to apparatus for transferring images from photographic media to electronic media, and particularly to a video transfer device for transferring images from films or transparencies (slides) and from prints (photos) to an electronic, video recording medium.

The invention is especially suitable for use in providing a video transfer device for the home or consumer market so that a non-professional can, without substantial investment in equipment, transfer photos, films and slides to videotape or other video recording media.

Video transfer devices which have heretofore been available have been limited in functionality in that transfer of images from transparencies, and particularly slides, has required the need for a slide projector. It is the principal feature of this invention to provide for slide to video transfer from individual slides which are mounted in a holder attachable to the device; the device providing illumination sufficiently concentrated to project the image carried by the slide to a video camera, for example which is part of a video recorder of the type generically known as a camcorder. An ancillary feature of the invention is to provide other modes of video transfer for motion picture film and/or slides projected on a film or slide projector and also for photo (prints carrying reflective images) to video transfer, and without incurring significant increase in cost on account of the addition of the direct slide to video transfer capability. It is a further feature of the invention to provide a simple and effective means for incorporating all three modes of operation (photo to video transfer, projected motion picture film or slides to video transfer and direct slide to video transfer) in a video transfer device.

Accordingly it is the principal object of the present invention to provide improved apparatus wherein direct slide (transparency) to video transfer or all three modes of transfer may be incorporated and without incurring significantly increased costs over a video transfer device which does not provide for direct slide (transparency) to video transfer.

Briefly described, apparatus for transferring images on motion picture film, photographs (prints) and transparencies (slides) to video signals recorded on video recording media (a video transfer device) utilizes a box having a plurality of openings, first and second ones of which are along the first axis and another of which is along a second axis transverse to the first axis. A first mirror is mounted in the box for reciprocal movement between first and second positions along a linear path which is inclined to both the first and second axes. When in its first position, the first mirror reflects images projected from motion picture film or transparencies through the third opening to tile first opening, adjacent to which and outside of the box, a video camera which provides the video signals can be located. A lamp in the box is disposed between the path of the first mirror and the second opening for illuminating a region outside of the box through the second opening when the lamp is activated. The first mirror is moveable to its second position out of blocking relationship of an image reflected along the first axis from a print disposed outside the box adjacent to the second opening through tile first opening to the video camera when it is disposed outside the box adjacent to the first opening. A second mirror, preferably mounted on an opposite side of a body which carries the first mirror, is reciprocally movable with the first mirror between the first and second positions. The second mirror faces the second opening, when it is disposed in the first position, and is inclined with respect to the first axis to reflect light from the lamp through the second opening, thereby concentrating the light and increasing the intensity of the illumination so that an image on a transparency (the slide) which is disposed adjacent to the second opening is directly transferred to the video camera when it is disposed outside the box in the path of the images projected through the transparency.

The foregoing and other objects, features and advantages of the invention, as well as a presently preferred embodiment thereof, will become more apparent from a reading of the following description in connection with the accompanying drawings in which.

Figure 1:
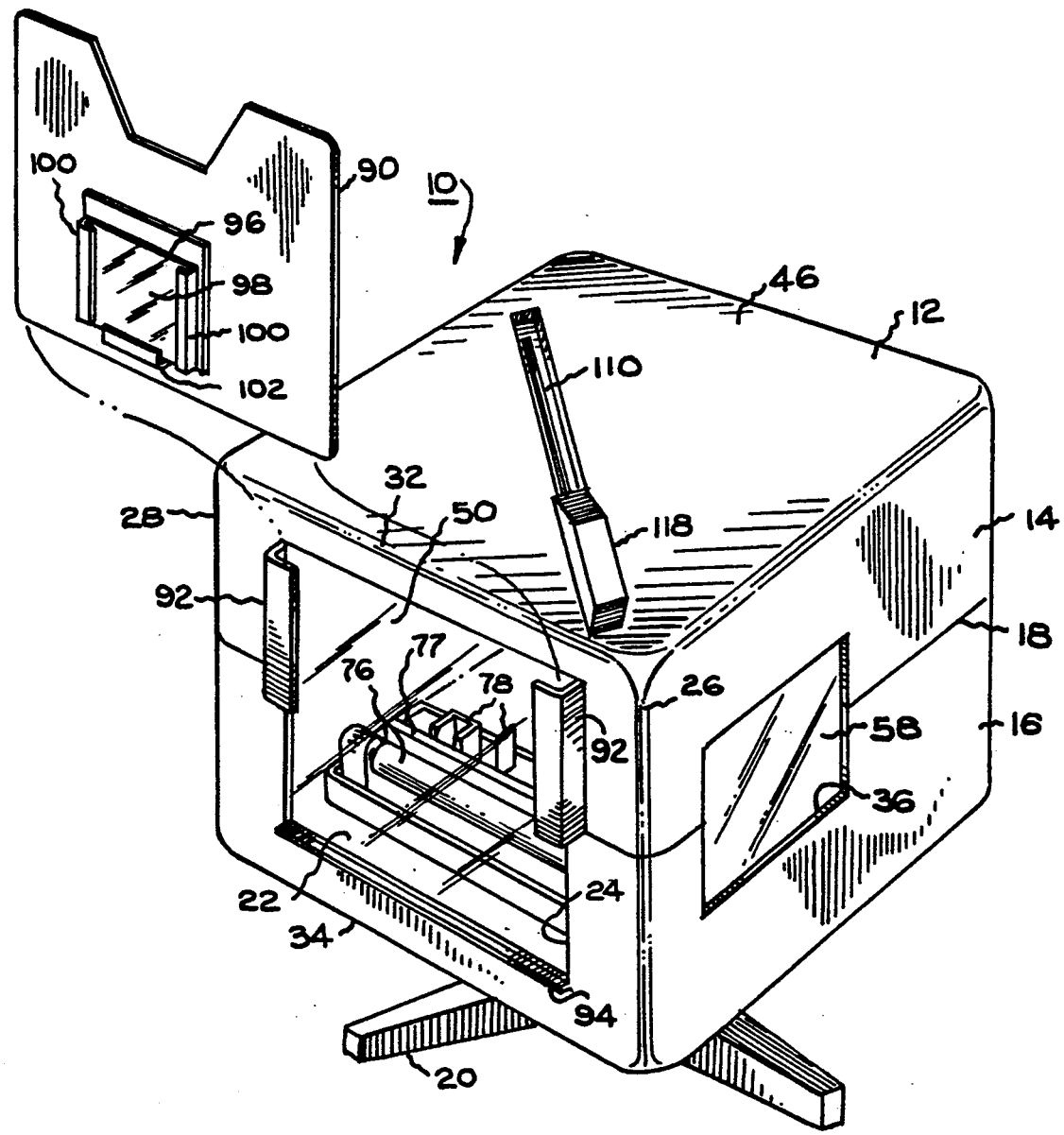
FIG. 1 is a perspective view of a video transfer device embodying the invention showing the photo/slide holder thereof before attachment to the device.

Referring to FIG. 1 there is shown a video transfer device 10 embodying the invention. A box 12 has upper and lower halves 14 and 16 (parts of upper and lower housing assemblies 17 and 19 shown in FIG. 2) which come together at a joint 18. This joint is preferably a rabette joint (not shown) formed by overlapping lips so as to be light tight along the joint 18. The box 12 is generally square in horizontal cross-section and is suitably approximately 10 inches wide along each side and 6 inches high. The box is supported on a base 20 having 3 legs 120° apart and a post which may be adjustable in height which is attached at its top to the bottom 22 of the box 12.

Figure 6:
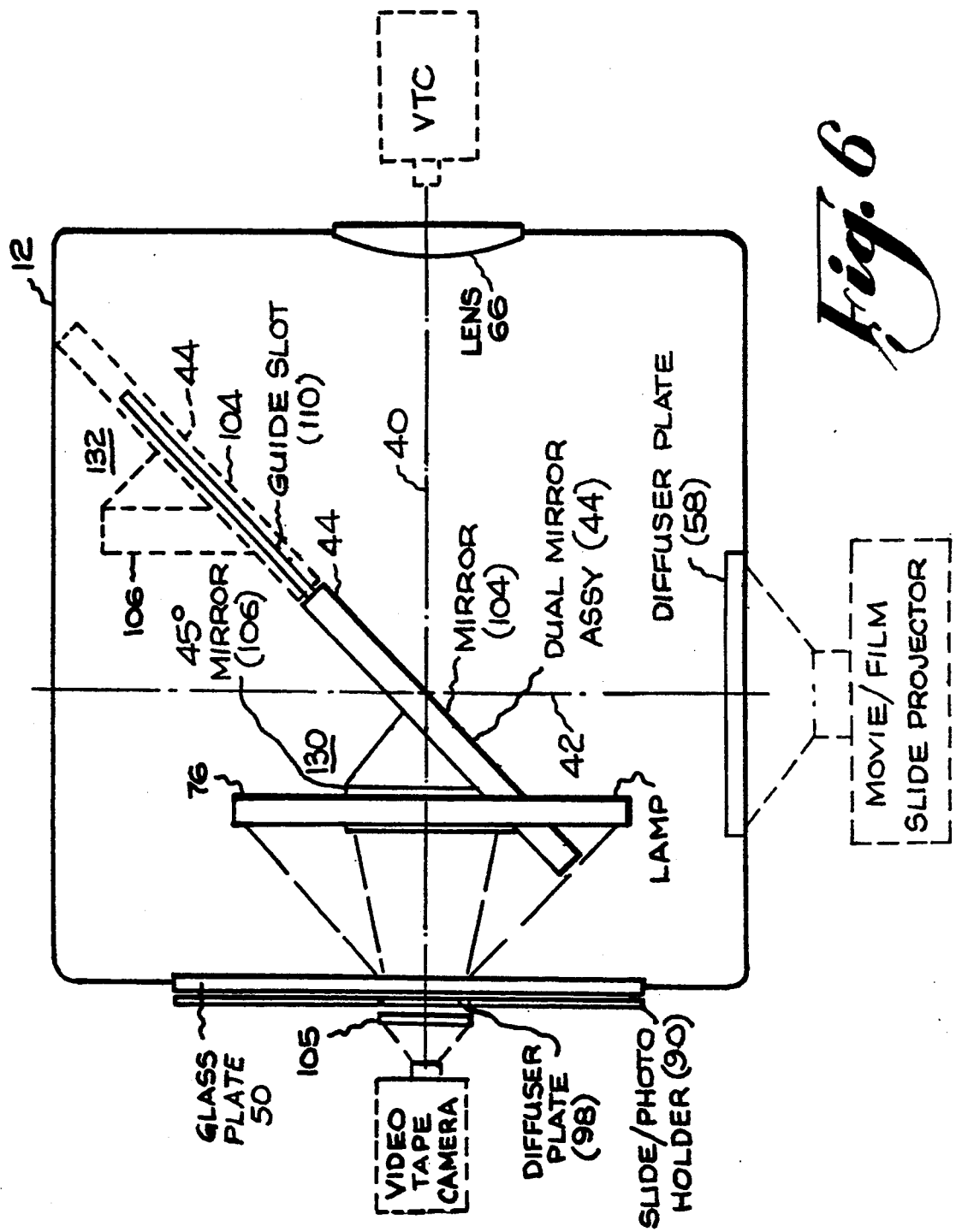
FIG. 6 is a schematic diagram of the device viewed looking upwardly from the bottom thereof and showing the dual mirror assembly in its two alternate positions.

There are three openings in the box. One of these openings 24 is rectangular, being longer in a direction between the side edges 26 and 28 than in the direction between the upper and lower edges 32 and 34 of the box. Another opening 36 which is generally square is located in a side wall of tile box. A third circular opening 38 is located in the side of the box opposite to the side having the rectangular opening 24. A line (a first axis) through the center of the openings 24 and 38 lies along the plane of the joint 18 and is perpendicular to a line (a second axis) through the center of the square opening 36 which also lies along the plane of the joint 18 (which is a horizontal plane through the middle of the box). These axis lines are shown at 40 and 42 in the schematic view (FIG. 6). The line 42 and the opening 36 are offset from the center of the box toward the side wall containing the rectangular opening 24. This arrangement lends itself to the positioning of a reciprocally movable, dual mirror assembly 44 which depends from the top wall 46 of the box 12 as will become more apparent hereinafter. The box is desirably made from opaque plastic, for example polystyrene. The dual mirror assembly includes a support body 48 which is desirably also made of a plastic material such as polycarbonate.

A glass (transparent) plate 50 is disposed in the rectangular opening 24 and held in place by ribs 52 and 54 along the sides of the opening 24 which defines grooves for receiving the plate 50. Notches on side wall stiffening ribs 56 also support the bottom and inside surface of the plate 50. A translucent plate 58 which has light diffusing characteristics is located in the opening 36 and held in place by grooved side ribs 60 and 62 (see FIG. 2) and also by notched ribs 64 similar to the ribs 56.

The circular opening 38 receives a lense 66 which is held in place by notched ribs 68 in a manner similar to which the notched ribs 56 and 64 retain the plates 50 and 58. The lense 66 focuses the images from tile slides motion picture film or photos (prints) onto a video tape camera (VTC or camcorder) when it is disposed outside the box 12 adjacent the opening 38 containing the lense 66 as shown in FIG. 6. The focus of the lense is at or near the plane of the images at the slide or the motion picture film projector or adjacent to tile glass plate 50.

Alignment of the upper and lower halves 14 and 16 of the box 12 is facilitated by posts 70 and 71 near the corners of the box. The posts 70 are recessed at the top thereof to receive the posts 71 in the upper half 14 of the box. Bolts extending through the posts 70 into threaded holes in the posts 71 in the upper half 14 of the box assemble the upper and lower housing assemblies 17 and 19 into an integrated assembly.

The lower assembly contains the transparent plate 50 and the diffusing plate 58 as well as tile lense 66. It also contains a lamp assembly 74 having a cylindrical flourescent lamp 76 and electrical power supply components for providing regulated current to the lamp. These components are shown at 78. The assembly 74 is mounted on a tray 67 which is releaseably secured in the bottom 22 of the box and may be pivoted at one end and latched at the other end. The assembly is removeable to facilitate changing of the lamp 76 when it burns out and also servicing of the components. A switch 80 for activating the lamp (turning it on and off) and a plug 82 for an output jack from an AC to DC adapter which supplies current to the circuits on the assembly 74 are located on the side of the lower assembly 19 (see FIG. 2).

The lamp assembly 74 also includes a reflector 77 which surrounds the lamp 76 along the bottom and sides thereof. This reflector is also mounted together with the lamp and its circuitry on the tray which is pivoted at one end and latched at the other end to the bottom 22 of the box 12.

A notched holder plate 90 of opaque, preferably plastic material, is received between flanges 92 in tile upper half 14 of the box 12 and rests on a bar 94. A photo or print is held by the plate between an inside surface thereof facing the transparent glass plate 50 and that plate 50, when video transfer of a reflected image from a photo or print is desired. The holder plate 90 also has a generally square opening 96 in which a translucent (ground glass or plastic) diffusing plate 98 (of material similar to the plate 58) is disposed. Flanges 100 and a bar 102 receive the edges and bottom of a transparency (a standard slide) when direct transfer of the image on that slide to video is desired.

Figure 2:
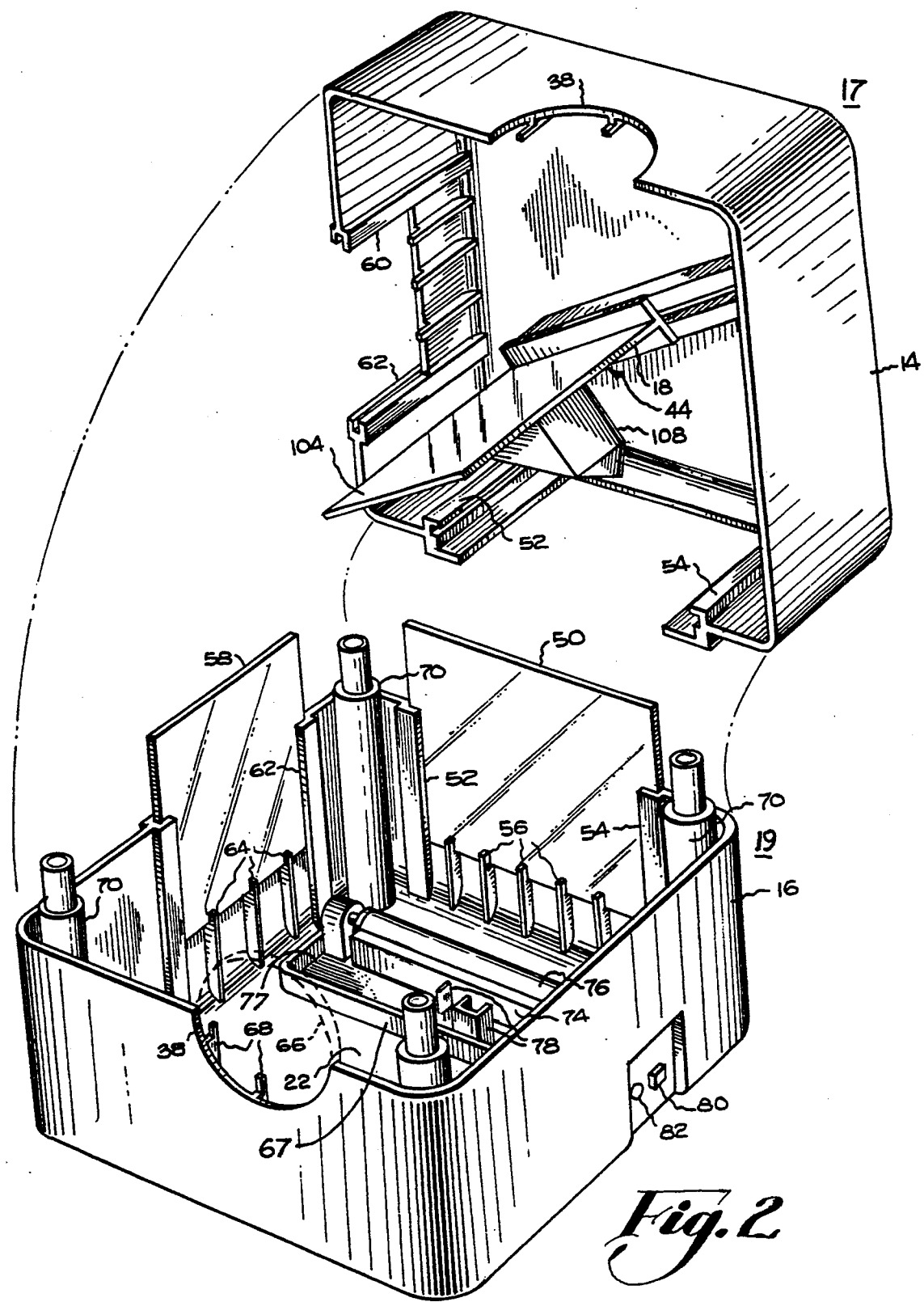
FIG. 2 is a perspective view of the device shown in FIG. 1 with the upper housing and lower housing assemblies thereof separated from each other and without the lens inserted in the lower assembly.
Figure 3:
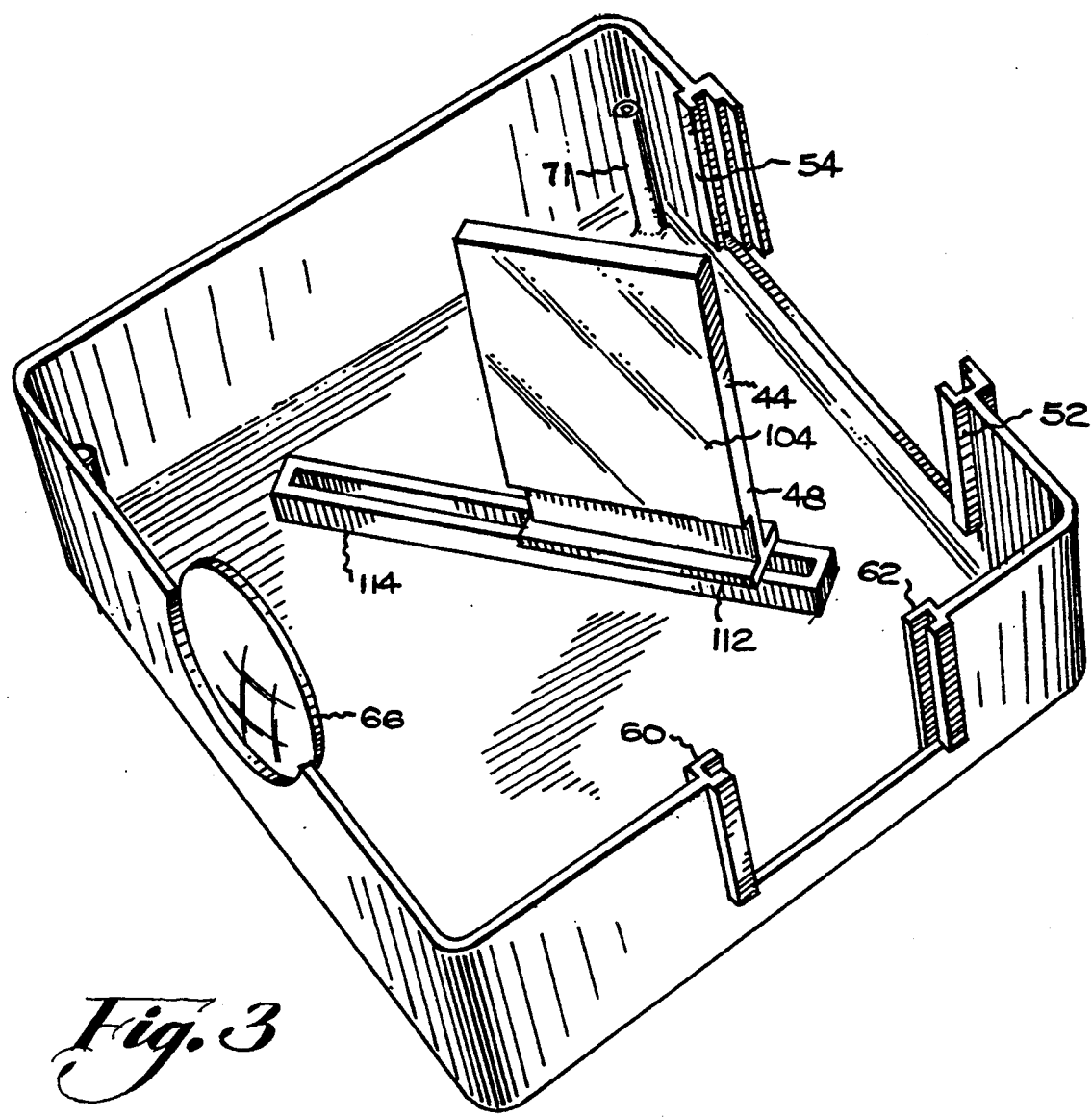
FIG. 3 is a perspective view of the upper assembly when viewed from the end thereof which has the lens receiving opening and showing the top of the device from the inside thereof.
Figure 4:
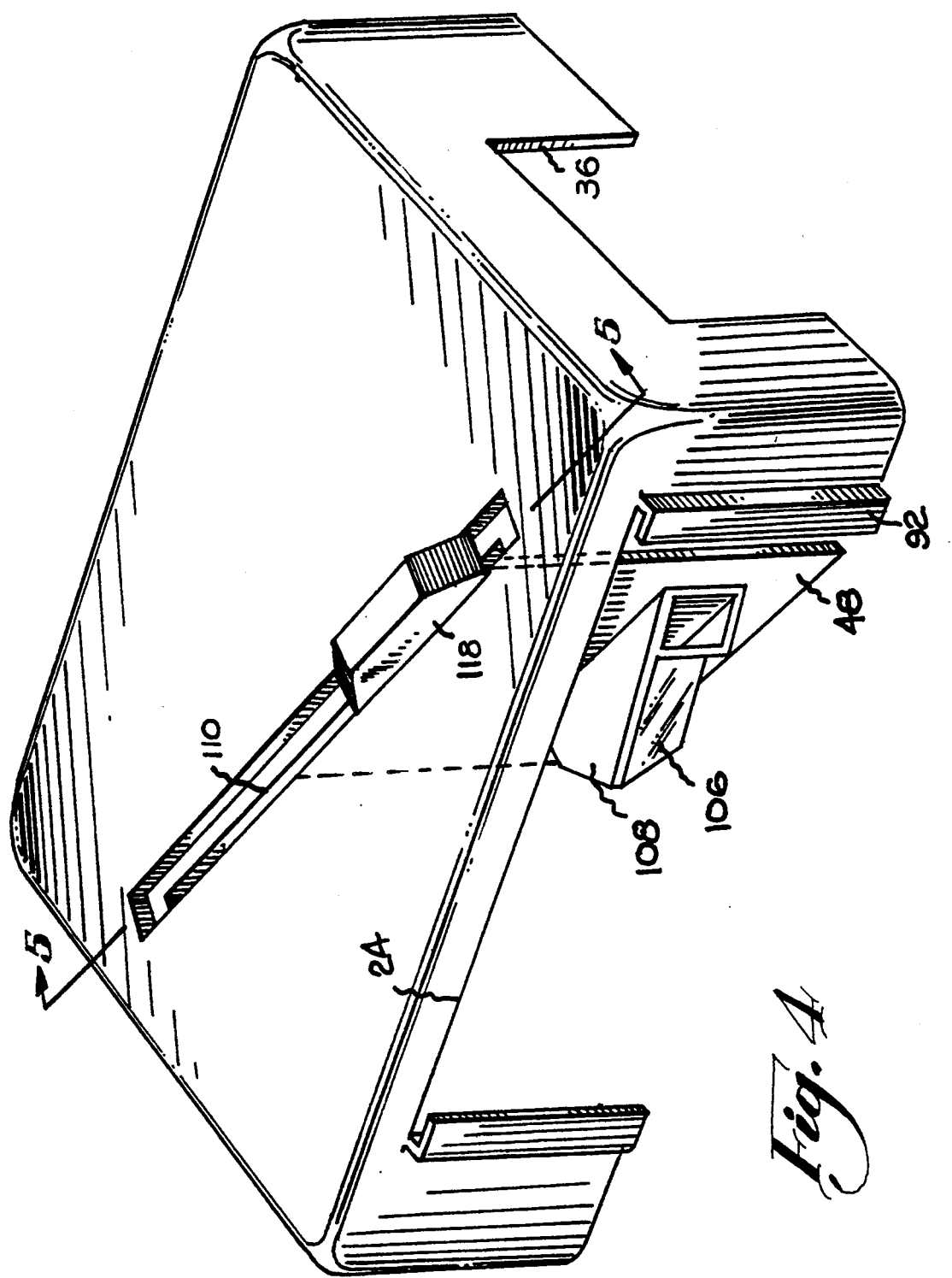
FIG. 4 is a perspective view of the upper assembly in upright position and viewed from the end thereof which receives the photo/slide holder.
Figure 5:
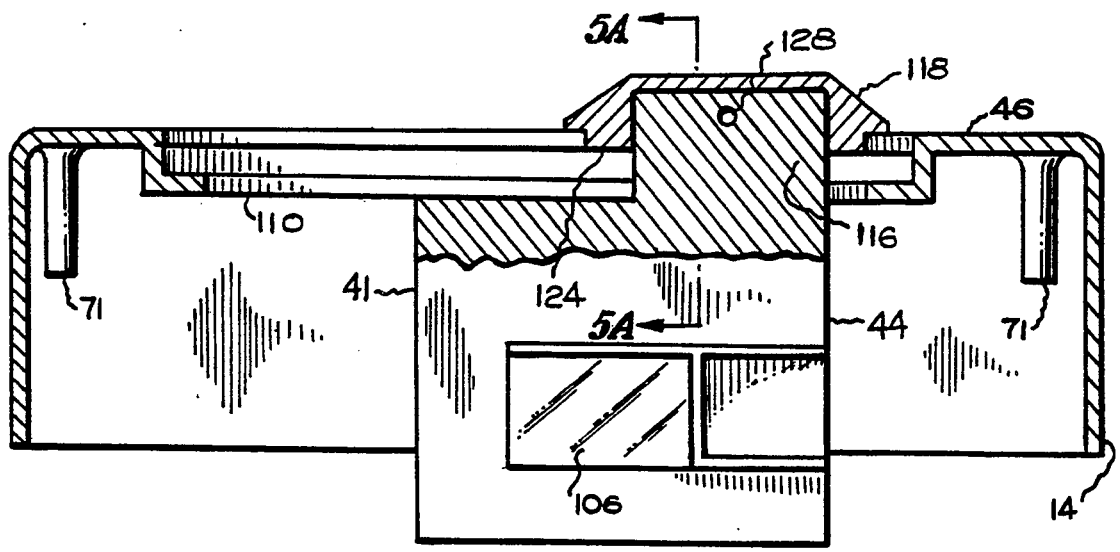
FIG. 5 is a sectional view along the line 5—5 in FIG. 4 illustrating the dual mirror body, the knob which supports the body in depending relationship from the top of the upper assembly and the s lot which guides the dual mirrors between positions for photo to video transfer and for motion picture/slide projection transfer and direct slide to video transfer.
Figure 5A:
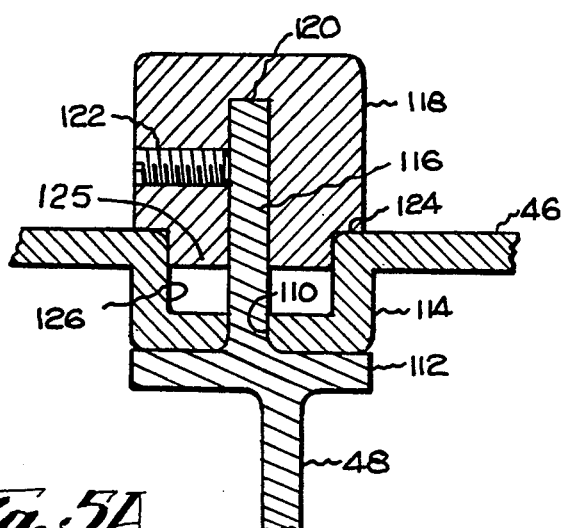
FIG. 5A is a fragmentary, sectional view taken along the line 5A—5A in FIG. 5.

The three modes of operation of the device 10 are obtained by selectively activating or deactivating the lamp 76 to provide a source of illumination for transfer from a photo or direct transfer from the slide which is inserted in the receptacle therefore on the holder 90. The lamp is turned off when transfer from a motion picture film or a slide projected by a film or slide projector through the diffusing plate 58 in the opening 36 is desired. The modes of operation are obtained by positioning the dual mirror assembly 44. This assembly is shown in FIG. 2 and also in FIGS. 3, 4, 5 and 5a. It utilizes two mirrors 104 and 106 which are disposed on opposite sides of the support body 48. Both mirrors are inclined to the axes 40 and 42. The mirror 104 is inclined at a 45° angle to the axis 40. The mirror 106 is inclined downwardly to the axis 40 and also to a plane containing the axis 42. The mirror 106 is disposed above the lamp 76 and is also inclined to horizontal plane containing the axis of the cylindrical lamp 76. The mirror 106 is on a projection 108 from the body 48 which provides a platform on which the mirror 106 is disposed with its reflective surface in the path of illumination from the backside of the lamp.

The illumination from lamp 76 and reflected by mirror 106 is illumination which would be wasted in that it is directed away from the holder 90 and therefore would be unavailable for illuminating the slide in the slide receptacle on the holder 90. The upper and lower edges of the mirror 106 are parallel to the transparent plate 50 and to the slide when in its receptacle on the holder 90. When the dual mirror assembly is positioned for the direct transfer of the image on the slide to the video camera (the camcorder), the mirror 106 is directly opposite to the slide and reflects illumination from the lamp onto the slide. This concentrates the illumination, increasing its intensity. The intensity is now sufficient to provide for the direct transfer of the image on the slide to the camcorder. This mode of operation will be more apparent from FIG. 6 which shows the mirror 106 in the position opposite to the diffuser plate 98 and the slide 105 which is in the receptacle on the holder 90.

Both mirrors 104 and 106 are reciprocal along a linear path defined by a guide slot 110 (see also FIG. 1). This path is transverse to both axes 40 and 42 (see FIG. 6). The upper part of the body 48 is provided with a flange 112 which is supported against a rib 114 which contains the guide slot 110 along the center thereof. A tongue 116 extends upwardly from the body into a knob 118 which is attached in a slot 120 in the knob by means of a set screw 122 (see FIG. 5A). The bottom of the knob 118 defines a shoulder 124 with a neck 126 projecting into the groove 126 in the rib 114. The knob 118 therefore supports the dual mirror assembly in depending relationship from the top 46 of the box 12. The dual mirror assembly is therefore reciprocally moveable along the guide slot 110 between the position shown in full and in dash lines at 130 and 132, respectively in FIG. 6.

In the position shown at 132 the flange 112 is stopped by the side wall of the box 12. When in the latter position the dual mirror assembly is out of the path of illumination reflected from the photo held by the holder 90 against the plate 58. Transfer of the image on the photo through the lense to the video tape camera, then positioned outside tile box adjacent to the opening 38 containing the lense 66, then can occur. In the mode of operation for transfer from movie film or slides which are projected by a movie film or slide projector, the movie film or slide projector is disposed outside the box adjacent to the diffuser plate 58 in the opening 36. The dual mirror assembly is in the position 130 in FIG. 6. The lamp 76 is turned off. Light is then projected from the projector and reflected by tile mirror 104 through lense 66 to the video camera which is then disposed outside the box adjacent the lense. Thus, by relocating the camera, either the direct slide transfer mode or tile mode of transfer from film or slides in a projector can be obtained. The video camera is in the same position for transfer from the movie film or slide projector or from the photo when the photo is located against the glass plate 50 by the holder 90.

The lense 66 provides gross or macrofocusing. Fine focusing may be accomplished by adjusting the lense of the camcorder.

From the foregoing description it will be apparent that there has been provided an improved video transfer device which has three modes of operation including direct transfer from transparencies (slides). Variations and modifications in the herein described apparatus, within the scope of the invention, will undoubtedly suggest themselves to those skilled in the art. Accordingly the foregoing description should be taken as illustrative and not in a limiting sense.

I claim:

1. Apparatus for transferring images on motion picture film, prints and transparencies to video signals recorded on a video record medium which apparatus comprises a box having a plurality of openings, first and second ones of said openings being along a first axis and another of said openings being along a second axis transverse to said first axis, a first mirror mounted in said box for reciprocal movement between first and second positions along a linear path which is inclined to both said first and second axes for reflecting, when in said first position, images projected from said motion picture film or transparencies through said third opening to said first opening adjacent to which and outside said box a video camera which provides the video signals can be disposed, a lamp in said box disposed between said path and said second opening for illumination of a region outside of said box through said second opening when activated, said first mirror being moveable to said second position out of blocking relationship of an image reflected along said first axis from a print disposed outside said box adjacent to said second opening in said region through said first opening to the video camera when it is disposed outside said box adjacent to said first opening, a second mirror reciprocally movable with said first mirror along said path between said first and second positions, said second mirror facing said second opening when in said first position and being inclined with respect to said first axis to reflect and concentrate light from said lamp through said second opening to project directly an image on a transparency disposed adjacent said second opening to the video camera when it is disposed outside said box in the path of said image from said transparency, whereby obviating the need for an external slide projector to provide back lighting of said transparency.

2. The apparatus according to claim 1 further comprising a body movable along said path, and wherein said first and second mirrors are mounted on opposite sides of said body.

3. The apparatus according to claim 2 wherein said box has a top wall and a bottom wall, said lamp being mounted in a pivotable and removable tray attached to said bottom wall and said body being mounted in depending relationship from said top wall.

4. The apparatus according to claim 3 wherein said top wall has a slot extending along said linear path, a knob outside said box having a shoulder bearing against said top wall, said body being connected through said slot to said knob and being movable by said knob between said first and second positions.

5. The apparatus according to claim 1 wherein said first mirror has a planar reflective surface disposed at about 45° to said axes and said second mirror has a planar reflective surface inclined at about 45° to a plane containing said first and second axes.

6. The apparatus according to claim 5 wherein said lamp is cylindrical and has an axis disposed transverse to said first axis, said second mirror also being inclined at about 45° to a plane containing the axis of said cylindrical lamp.

7. The apparatus according to claim 1 wherein said first opening has a lens therein which has a focus outside said box adjacent to said first opening so as to focus said image from said transparency and from said motion picture film indirectly projected through said third opening into said box and said image from said photo or other print originating at said second opening through said lens onto said video camera, when positioned adjacent to said first opening, and wherein the image of a transparency positioned adjacent to said second opening is directly projected through that second opening onto said video camera when positioned adjacent to said second opening.

8. The apparatus according to claim 1 wherein said first opening has a lense therein, said third opening has a light diffusing plate therein, and said second opening has a transparent plate therein, and means for holding a print or transparency adjacent to said transparent plate.

9. The apparatus according to claim 8 wherein said holding means comprises an opaque member presenting a surface on one side thereof toward said transparent plate, such that the print can be located between said surface and said transparent plate, an opening in said opaque plate, a light diffusing plate disposed in said opening in said opaque plate, and means providing a receptacle on the side of said opaque plate opposite to said one side thereof for receiving a slide providing said transparency adjacent said diffusing plate in said opening on said opaque plate.

10. A video transfer box-like device for use with a video recording camera, said box-like device having a front wall aperture for alignment with the lens of a video recording camera; a side wall aperture for receipt of images into said device from a film or slide projector; a movable first mirror means in said device capable of two positions, an operative position reflecting film or slide images projected thereon through said side wall aperture to said front wall aperture, and a non-reflecting image position; a rear wall aperture, opposed to said front wall aperture; means capable of holding photographs at said rear wall aperture to transfer images of photographs to a video recording camera located at said front wall aperture when said mirror means is moved to its non-reflecting image position, and further comprising a lamp for back-illuminating a transparency held at said rear wall aperture to enable the transfer of an image from said transparency to a video camera located at said rear wall aperture, said mirror means further including back light recapture means for enhancing the illumination of said image of said transparency with light from said lamp, said recapture means including a second mirror secured to said first mirror positionable adjacent to and behind said lamp, facing said rear wall aperture for redirecting and concentrating light directed from said lamp in the direction away from said transparency back towards said transparency, whereby said transparency is lit by direct light from said lamp and by the redirected light from said lamp to allow direct transfer of said image from said transparency to a video camera.

11. The apparatus according to claim 10 further comprising a reflector adjacent said lamp which reflects light radiated by said lamp, said reflector and said mirror being disposed facing each other on opposite sides of said lamp.

12. The apparatus according to claim 11 wherein said lamp is cylindrical and extends along an axis, said reflector being a segment of a cylinder extending along said axis around said lamp, and said mirror having a planar reflective surface inclined at about 45° to a plane containing said axis of said lamp.

13. The apparatus according to claim 10 wherein said device comprises a box which has an opening, means for removably retaining said transparency on said box adjacent to said opening, said mirror being movably mounted in said box and disposable either in a first position facing said opening or in a second position in non-blocking relationship to a path along said box through said opening.

14. The apparatus according to claim 13 wherein said box has a wall from which said mirror depends, said mirror being movably mounted on said wall for movement along said wall between said first and second positions.

15. The apparatus according to claim 14 wherein said wall has a slot extending along the linear path transverse to said path through said box, a knob outside said box having a shoulder disposed on said wall, and said mirror being connected to said knob through said sloe and being movable by said knob between said positions.

* * * * *